US012647845B2

(12) United States Patent
Ogawa et al.

(10) Patent No.: US 12,647,845 B2
(45) Date of Patent: Jun. 2, 2026

(54) COMMUNICATION CONTROL METHOD AND NODE FOR PERFORMING HANDOVER WITH NETWORK SLICE

(71) Applicant: KYOCERA Corporation, Kyoto (JP)

(72) Inventors: Yuki Ogawa, Yokohama (JP); Takashi Yokoyama, Yokohama (JP); Kousuke Kido, Yokohama (JP); Nobuyuki Shiraiwa, Yokohama (JP); Yuichiro Maki, Yokohama (JP); Takanori Yamauchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 50 days.

(21) Appl. No.: 18/512,302

(22) Filed: Nov. 17, 2023

(65) Prior Publication Data

US 2025/0071626 A1 Feb. 27, 2025

(30) Foreign Application Priority Data

Aug. 21, 2023 (JP) ................................. 2023-133993

(51) Int. Cl.
*H04W 36/00* (2009.01)
*H04W 36/30* (2009.01)

(52) U.S. Cl.
CPC ... *H04W 36/0058* (2018.08); *H04W 36/0072* (2013.01); *H04W 36/30* (2013.01)

(58) Field of Classification Search
CPC ......... H04W 36/0058; H04W 36/0072; H04W 36/30; H04W 36/13; H04W 36/26; H04W 36/00837
See application file for complete search history.

(56) References Cited

U.S. PATENT DOCUMENTS 7,693,518 B2 4/2010 Miyata
10,582,432 B2* 3/2020 Park ................ H04W 36/00837
(Continued)

FOREIGN PATENT DOCUMENTS

EP 4037379 A1 8/2022
JP 2006-148836 A 6/2006
(Continued)

OTHER PUBLICATIONS

3rd Generation Partnership Project; Technical Specification Group Services and System Aspects; System architecture for the 5G System (5GS); Stage 2 (Release 17); 3GPP TS 23.501 V17.9.0; Jun. 2023; pp. 1-572.

(Continued)

*Primary Examiner* — Justin T Van Roie
(74) *Attorney, Agent, or Firm* — Studebaker Brackett PLLC

(57) ABSTRACT

A communication control method and a node that allow a user equipment to perform handover to an optimal cell according to a service type are provided. The communication control method includes receiving, at a node, a first message including network slice information related to a network slice and/or service quality information indicating service quality from a core network apparatus. The communication control method includes receiving, at the node, a measurement report from a user equipment. The communication control method further includes determining, at the node, a threshold value to be used for handover decision, based on the network slice information and/or the service quality information, in response to reception of the measurement report. The communication control method further includes deciding, at the node, whether to handover the user equipment, based on a received quality value indicating (Continued)

received quality included in the measurement report and the threshold value.

11 Claims, 12 Drawing Sheets

(56)                    References Cited

U.S. PATENT DOCUMENTS

| | | | | |
|---|---|---|---|---|
| 2019/0327651 | A1* | 10/2019 | Yiu | .......................... H04L 5/0048 |
| 2022/0014963 | A1 | 1/2022 | Yeh et al. | |
| 2022/0078676 | A1 | 3/2022 | Abdel Shahid et al. | |
| 2022/0141738 | A1 | 5/2022 | Chou et al. | |
| 2022/0330112 | A1 | 10/2022 | Kumar Patra et al. | |
| 2023/0026417 | A1 | 1/2023 | Thantharate et al. | |
| 2023/0062362 | A1 | 3/2023 | Sun et al. | |

FOREIGN PATENT DOCUMENTS

| | | | | | |
|---|---|---|---|---|---|
| JP | 2009-005385 | A | | 1/2009 | |
| JP | 2013-191967 | A | | 9/2013 | |
| KR | 20220052820 | A | * | 4/2022 | ........ H04W 36/0072 |
| WO | 2023/074530 | A1 | | 5/2023 | |

OTHER PUBLICATIONS

3rd Generation Partnership Project; Technical Specification Group Radio Access Network; NR; NR and NG-RAN Overall Description; Stage 2 (Release 17); 3GPP TS 38.300 V17.4.0; Mar. 2023. pp. 1-210.

3rd Generation Partnership Project; Technical Specification Group Radio Access Network; NG-RAN; Architecture description (Release 17); 3GPP TS 38.401 V17.5.0; Jun. 2023; pp. 1-123.

* cited by examiner

| # | UE | NSSAI SST | COMMUNICATION CHARACTERISTICS |
|---|---|---|---|
| 1 | AAAAAAAAAA | 1:eMBB | REQUIREMENT OF WIDE FREQUENCY BAND |
| 2 | BBBBBBBBBB | 1:eMBB | REQUIREMENT OF WIDE FREQUENCY BAND |
| 3 | CCCCCCCCCC | 2:URLLC | REQUIREMENT OF HIGH RECEIVED QUALITY |
| 4 | DDDDDDDDDD | 3:mMTC | REQUIREMENT OF STABLE FREQUENCY BAND |
| | ... | ... | ... |

FIG. 8A

| # | UE | NSSAI SST | QoS | | | COMMUNICATION CHARACTERISTICS |
|---|---|---|---|---|---|---|
| | | | 5QI | Packet Delay Budget | Packet Error Rate | |
| 1 | AAAAAAAAA | 1:eMBB | 1 | 100ms | 10^-2 | REQUIREMENT OF WIDE FREQUENCY BAND |
| 2 | BBBBBBBBB | 1:eMBB | 2 | 150ms | 10^-3 | REQUIREMENT OF WIDE FREQUENCY BAND |
| 3 | CCCCCCCCC | 2:URLLC | 3 | 50ms | 10^-3 | REQUIREMENT OF HIGH RECEIVED QUALITY |
| 4 | DDDDDDDDD | 3:mMTC | 4 | 300ms | 10^-6 | REQUIREMENT OF STABLE FREQUENCY BAND |
| | | | | | | |

FIG. 8B

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| SpCell ID | O | | NR CGI 9.3.1.12 | Special Cell as defined in TS 38.321 [16]. For handover case, this IE is considered as target cell. | YES | ignore |
| ServCellIndex | O | | INTEGER (0..31, ...) | | YES | reject |
| SpCell UL Configured | O | | Cell UL Configured 9.3.1.33 | | YES | ignore |
| DRX Cycle | O | | DRX Cycle 9.3.1.24 | | YES | ignore |
| CU to DU RRC Information | O | | 9.3.1.25 | | YES | reject |
| Transmission Action Indicator | O | | 9.3.1.11 | | YES | ignore |
| Resource Coordination Transfer Container | O | | OCTET STRING | Includes the MeNB Resource | YES | ignore |

FIG. 10A

| IE/Group Name | Presence | Range | IE type and reference | Semantics description | Criticality | Assigned Criticality |
|---|---|---|---|---|---|---|
| CG-ConfigInfo | O | | OCTET STRING | CG-ConfigInfo, as defined in TS 38.331 [8]. | | |
| UE-CapabilityRAT-ContainerList | O | | OCTET STRING | This IE is used in the NG-RAN and it consists of the UE-CapabilityRAT-ContainerList, as defined in TS 38.331 [8]. | | |
| MeasConfig | O | | OCTET STRING | MeasConfig, as defined in TS 38.331 [8] (without MeasGapConfig). For EN-DC/NGEN-DC operation, includes the list of FR2 frequencies for which the gNB-CU requests the gNB-DU to generate gaps. For NG-RAN,NE-DC and MN for NR-NR DC, includes the list of FR1 and/or FR2 frequencies for which the gNB-CU requests the gNB-DU to generate gaps and the gap type (per-UE or per-FR). | | |
| Handover Preparation Information | O | | OCTET STRING | HandoverPreparationInformation, as defined in TS 38.331 [8] | YES | ignore |
| CellGroupConfig | O | | OCTET STRING | CellGroupConfig, as defined in TS 38.331 [8]. | YES | ignore |
| Measurement Timing Configuration | O | | OCTET STRING | Contains the MeasurementTimingConfiguration inter-node message defined in TS 38.331 [8] | YES | ignore |

FIG. 10B

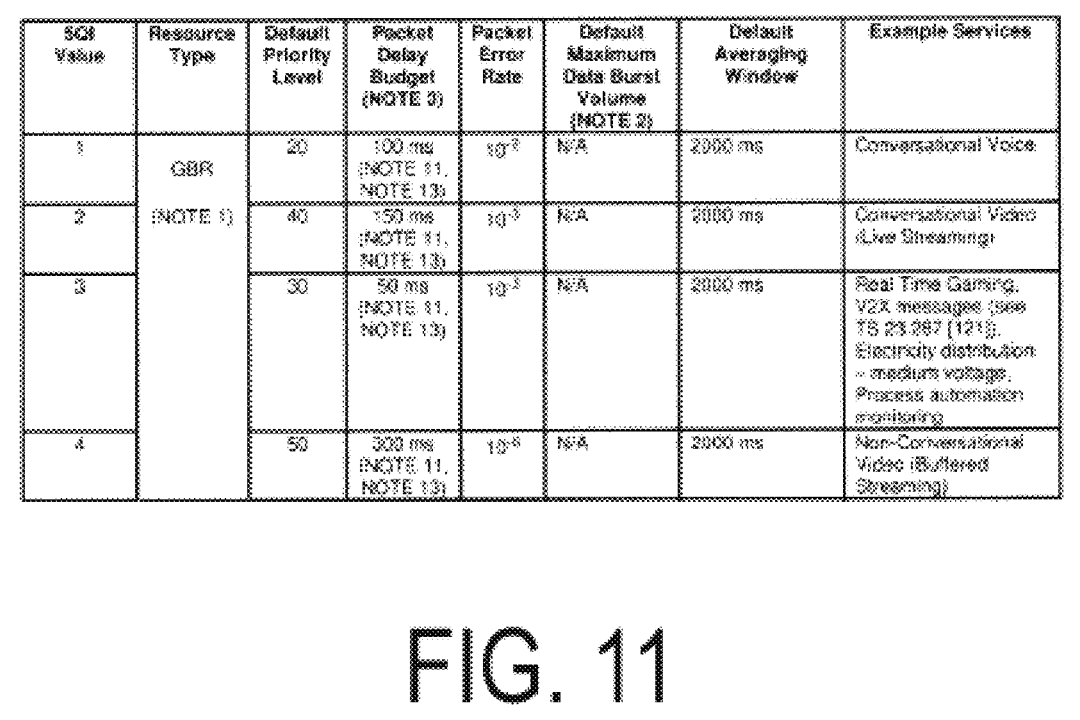

| SQI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 | | 30 | 50 ms (NOTE 11, NOTE 13) | $10^{-3}$ | N/A | 2000 ms | Real Time Gaming, V2X messages (see TS 23.287 [121]), Electricity distribution – medium voltage, Process automation monitoring |
| 4 | | 50 | 300 ms (NOTE 11, NOTE 13) | $10^{-6}$ | N/A | 2000 ms | Non-Conversational Video (Buffered Streaming) |

FIG. 11

COMMUNICATION CONTROL METHOD AND NODE FOR PERFORMING HANDOVER WITH NETWORK SLICE

RELATED APPLICATION

The present application is a continuation based on Japanese Patent Application No. 2023-133993, filed on Aug. 21, 2023. The content of which is incorporated by reference herein in their entirety.

TECHNICAL FIELD

The present invention relates to a communication control method and a node.

BACKGROUND OF INVENTION

One example of movement control applied to a User Equipment (UE) in an RRC connected state is handover. Handover refers to technology in which the user equipment switches a cell to be connected to. The user equipment measures received quality in accordance with configuration information (MeasConfig) provided from a node, and transmits a measurement report (MeasurementReport) including the received quality to the node. The node determines execution of handover based on the measurement report, and indicates handover to the user equipment. The handover allows the user equipment to perform wireless communication with an optimal cell, for example.

On the other hand, in a mobile communication system, network slicing has been introduced. Network slicing is technology in which a physical network constructed by an operator is virtually divided, in such a manner that a plurality of virtual networks are created. Each virtual network is referred to as a network slice. The network slicing allows a communication carrier to create slices according to service requirements of different service types, such as enhanced Mobile Broadband (eMBB), Ultra-Reliable and Low Latency Communications (URLLC), and massive Machine Type Communications (mMTC), for example. The network slicing allows for optimization of network resources, for example.

CITATION LIST

Non-Patent Literature

Non-Patent Document 1: 3GPP TS 38.300 V17.4.0 (2023-03)
Non-Patent Document 2: 3GPP TS 38.401 V17.5.0 (2023-06)
Non-Patent Document 3: 3GPP TS 23.501 V17.9.0 (2023-06)

SUMMARY

Problem to be Solved

However, in a node, handover decision is performed based on received quality included in a measurement report, regardless of a service type corresponding to a network slice. Thus, a user equipment may not be able to perform handover to an optimal cell according to the service type.

In view of this, the present disclosure provides a communication control method and a node that allow a user equipment to perform handover to an optimal cell according to a service type.

Solution to Problem

In an aspect, a communication control method is a communication control method in a mobile communication system. The communication control method includes receiving, at a node, a first message including at least one of network slice information related to a network slice or service quality information indicating service quality from a core network apparatus. The communication control method includes receiving, at the node, a measurement report from a user equipment. The communication control method further includes determining, at the node, a threshold value to be used for handover decision, based on at least one of the network slice information or the service quality information, in response to reception of the measurement report. The communication control method further includes deciding, at the node, whether to handover the user equipment, based on the threshold value and a received quality value indicating received quality included in the measurement report.

In an aspect, a node is a node capable of communicating with a user equipment and a core network apparatus. The node includes a receiver that receives a first message including at least one of network slice information related to a network slice or service quality information indicating service quality from a core network apparatus and receives a measurement report from a user equipment. The base station includes a controller that determines a threshold value to be used for handover decision, based on at least one of the network slice information or the service quality information, in response to reception of the measurement report. The controller decides whether to handover the user equipment, based on the threshold value a received quality value indicating received quality included in the measurement report.

Advantageous Effect

According to the present disclosure, a communication control method and anode that allow a user equipment to perform handover to an optimal cell according to a service type can be provided.

BRIEF DESCRIPTION OF THE DRAWINGS

FIG. 8A is a diagram illustrating an example of association according to the first embodiment, and FIG. 8B is a diagram illustrating an example of association according to a second embodiment.

FIG. 10A is a diagram illustrating examples of information elements included in a UE context modification request message according to the first embodiment, and FIG. 10B is a diagram illustrating examples of information elements included in "CU to DU RRC information" according to the first embodiment.

FIG. 11 is a diagram illustrating an example of a 5QI according to the first embodiment.

DESCRIPTION OF EMBODIMENTS

First Embodiment

Embodiments will be described in detail below with reference to the drawings. In the description of the drawings, the same or similar parts are denoted by the same or similar reference signs.

Configuration of Mobile Communication System

First, a configuration example of a mobile communication system according to a first embodiment will be described.

Figure 1:
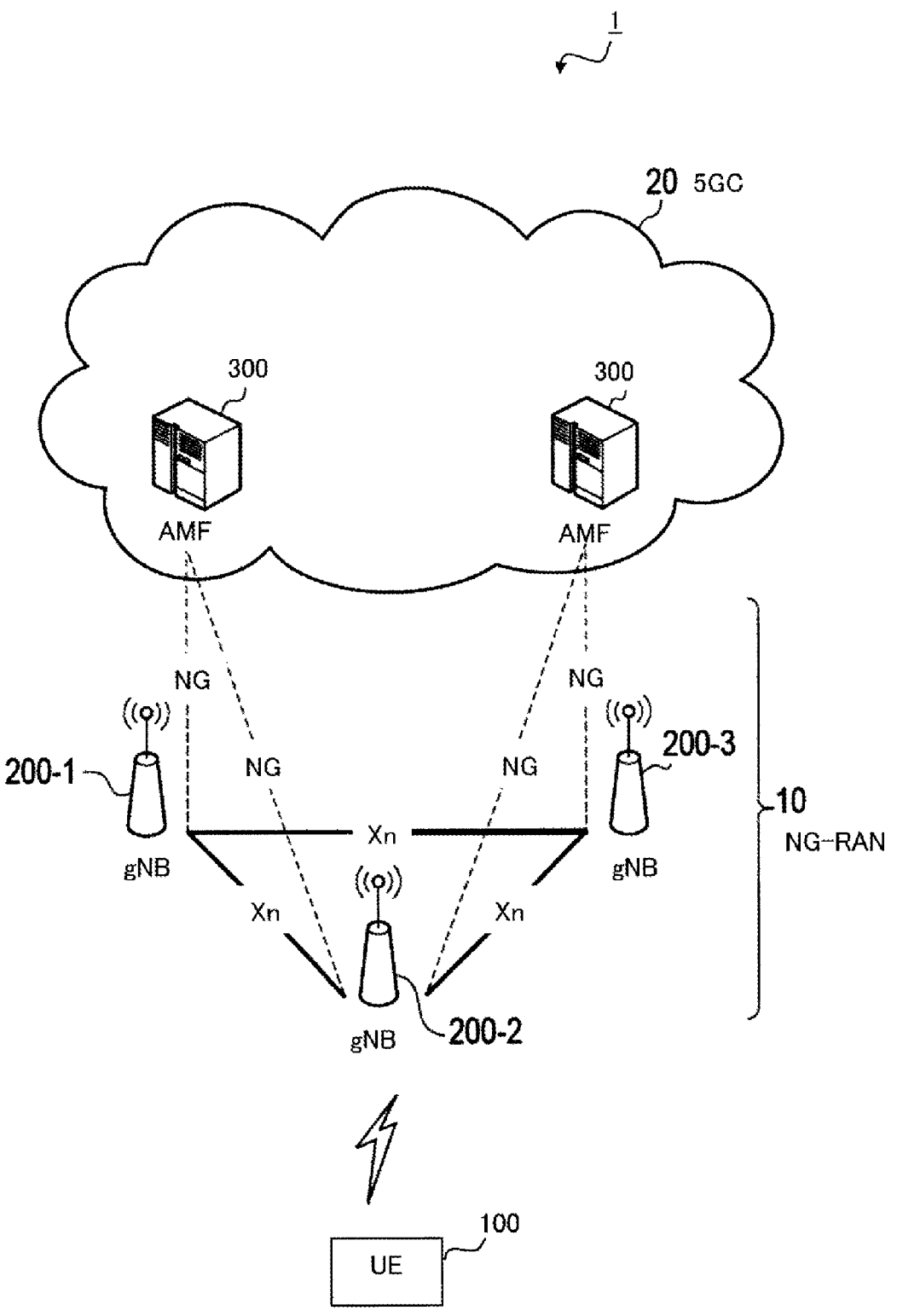
FIG. 1 is a diagram illustrating a configuration example of a mobile communication system according to a first embodiment.

FIG. 1 is a diagram illustrating a configuration of a mobile communication system 1. The mobile communication system 1 complies with the 5th Generation System (5GS) of the 3GPP (trade name) standard. The description below takes the 5GS as an example, but a Long Term Evolution (LTE) system or a sixth generation (6G) system may be at least partially applied to the mobile communication system. The mobile communication system 1 illustrated in FIG. 1 may be the 5G system.

The mobile communication system 1 includes a User Equipment (UE) 100, a gNB (node) 200, and an access mobility management apparatus (Access and Mobility Management Function (AMF)) 300.

The AMF 300 is an example of a core network apparatus. Although not illustrated in FIG. 1, examples of the core network apparatuses include a Session Management Function (SMF) and a User Plane Function (UPF). On the other hand, the gNB 200 is an example of a node connected to a core network (CN). The description below takes the gNB 200 as an example of a node, but the node may be an evolved Node B (eNB) in Long Term Evolution (LTE), or may be a node of 6G or later generations.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (an Aerial UE, or an Unmanned Aerial Vehicle (UAV)). Alternatively, the UE 100 may be an Internet of Things (IoT) device, an IoT sensor, or the like.

The gNBs 200 are interconnected via an Xn interface which is an inter-node interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency (hereinafter simply referred to as one "frequency").

Note that the gNB 200 can be connected to an Evolved Packet Core (EPC) corresponding to a core network of LTE. The node (evolved Node B (eNB)) of LTE can also be connected to a network of 5G. The node of LTE and the gNB 200 can also be connected via an inter-node interface.

The AMF 300 performs various types of mobility controls and the like for the UE 100. The AMF 300 can communicate with the UE 100, using a NAS message on an N1 interface. The AMF 300 can communicate with the gNB 200, using an N2 message on an N2 interface. The AMF 300 performs such communication, and thereby performs mobility management for the UE 100, location management for the UE 100, and the like. Note that the AMF 300 is connected to the SMF via a network.

Configuration Example of UE

First, a configuration example of the UE 100 will be described.

Figure 2:
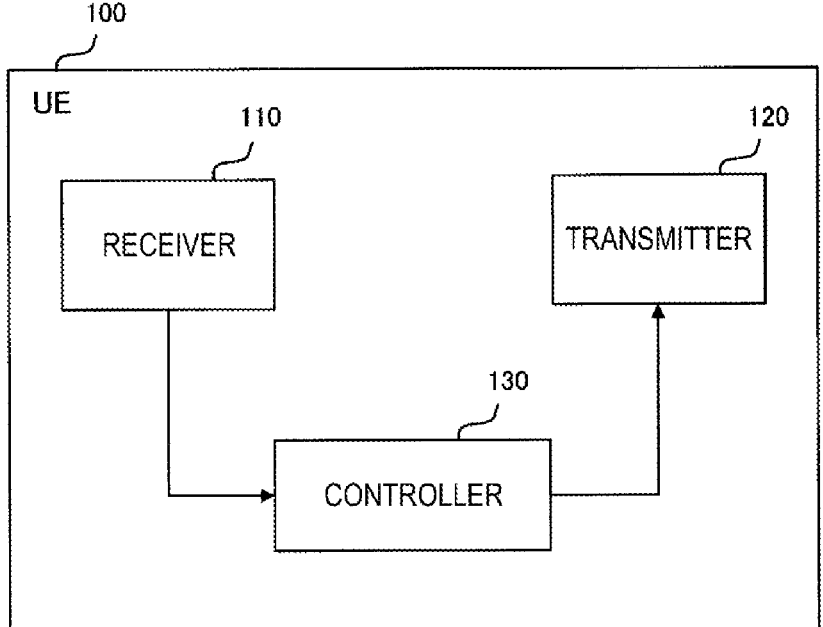
FIG. 2 is a diagram illustrating a configuration example of a user equipment (UE) according to the first embodiment.

FIG. 2 is a diagram illustrating a configuration example of the UE 100 (user equipment) according to the first embodiment. The UE 100 includes a receiver 110, a transmitter 120, and a controller 130. The receiver 110 and the transmitter 120 constitute a wireless communicator that performs wireless communication with the gNB 200.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. Such processing includes processing of each layer to be described below. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. Note that processing or operation in the UE 100 to be described below may be performed by the controller 130. Transmission of a message in the UE 100 to be described below may be performed by the transmitter 120, and reception of a message in the UE 100 may be performed by the receiver 110.

Configuration Example of gNB

A configuration example of the gNB 200 will be described.

Figure 3:
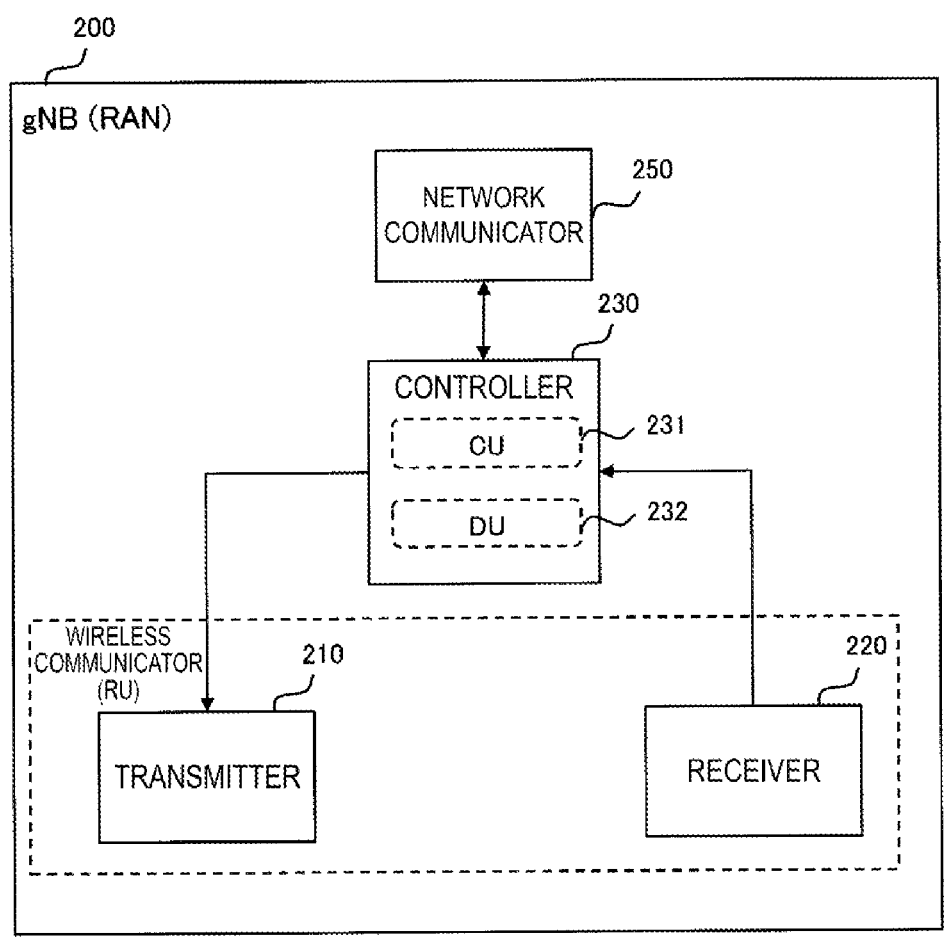
FIG. 3 is a diagram illustrating a configuration example of a gNB (node) according to the first embodiment.

FIG. 3 is a diagram illustrating a configuration of the gNB 200 (node) according to the first embodiment. The gNB 200 includes a transmitter 210, a receiver 220, a controller 230, and a network communicator 250. The transmitter 210 and the receiver 220 constitute a wireless communicator that performs wireless communication with the UE 100. The network communicator 250 constitutes a network communicator that performs communication with the AMF 300.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processes in the gNB 200. Such processing includes processing of each layer to be described below. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. Note that processing or operation in the gNB 200 to be described below may be performed by the controller 230. Transmission of a message in the gNB 200 to be described below may be performed by the transmitter 210 and the network communicator 250, and reception of a message in the gNB 200 may be performed by the receiver 220 and the network communicator 250.

The network communicator 250 is connected to the AMF 300 via an NG interface which is an interface between the node and the core network. Specifically, the network communicator 250 is connected to the AMF 300 via an N2 interface. The network communicator 250 is connected to another gNB via an Xn interface. The network communicator 250 may also perform various types of processing under control of the controller 230.

Note that the gNB 200 may include (i.e., may employ function division of) a Central Unit (CU) 231 and a Distributed Unit (DU) 232. In this case, both of the units may be connected via an F1 interface which is a fronthaul interface. As illustrated in FIG. 3, the CU 231 and the DU 232 may be included in the controller 230. Alternatively, the CU 231 may include a first controller, and the DU 232 may include a second controller. Regarding the function division, the wireless communicator may include a Radio Unit (RU). One RU may include one cell, or may include a plurality of cells. The CU 231 and the DU 232 may be connected via an F1 interface which is a midhaul interface. The DU 232 and the RU may be connected via an Open Radio Access Network (O-RAN) interface which is a fronthaul interface. The CU 231 and the core network apparatus may be connected via an NG interface, and the CU 231 and another gNB may be connected via an Xn interface. The CU may be hereinafter referred to as a "gNB-CU". The DU may be referred to as a "gNB-DU".

Configuration Example of AMF

A configuration example of the AMF 300 will be described.

Figure 4:
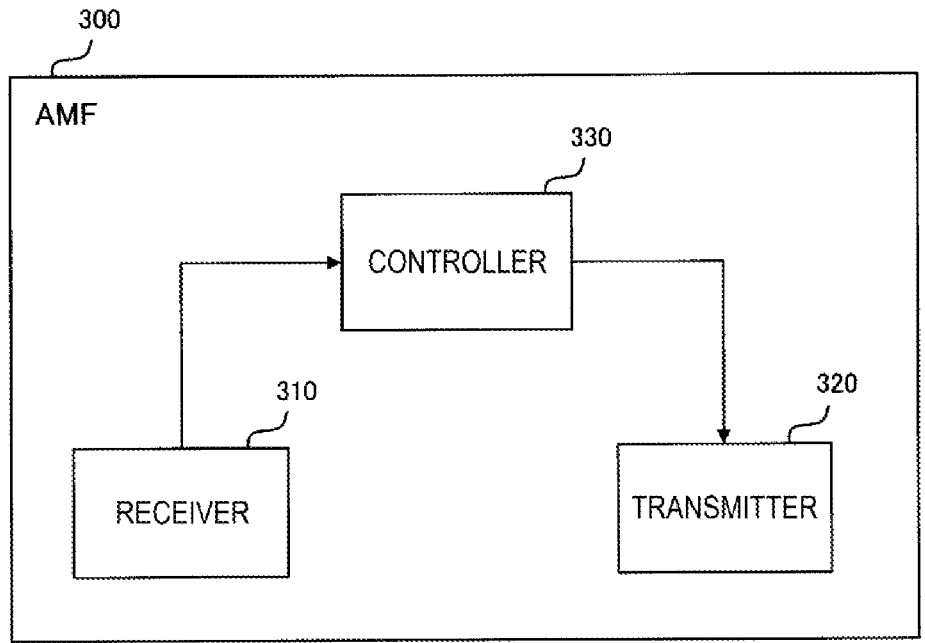
FIG. 4 is a diagram illustrating a configuration example of an AMF according to the first embodiment.

FIG. 4 is a diagram illustrating a configuration example of the AMF 300 according to the first embodiment. As illustrated in FIG. 4, the AMF 300 includes a receiver 310, a transmitter 320, and a controller 330.

The receiver 310 performs various types of reception under control of the controller 330. The receiver 310 receives a message (for example, a message via an N2 interface) transmitted from the gNB 200. The receiver 310 outputs the received message to the controller 330.

The transmitter 320 performs various types of transmission under control of the controller 330. The transmitter 320 transmits a message (for example, a message via an N2 interface) received from the controller 330 to the gNB 200. The transmitter 320 transmits a message (for example, a message via an N11 interface) received from the controller 330 to another core network apparatus (for example, the SMF).

The controller 330 performs various types of control and processes in the AMF 300. The controller 330 includes at least one processor and at least one memory. The memory stores a program to be executed by the processor and information to be used for processing by the processor. The processor may include a CPU. The CPU executes the program stored in the memory to thereby perform various types of processing. Note that processing or operation in the AMF 300 to be described below may be performed by the controller 330. Transmission of a message in the AMF 300 to be described below may be performed by the transmitter 320, and reception of a message in the AMF 300 may be performed by the receiver 310.

Protocol Stack of User Plane

Figure 5:
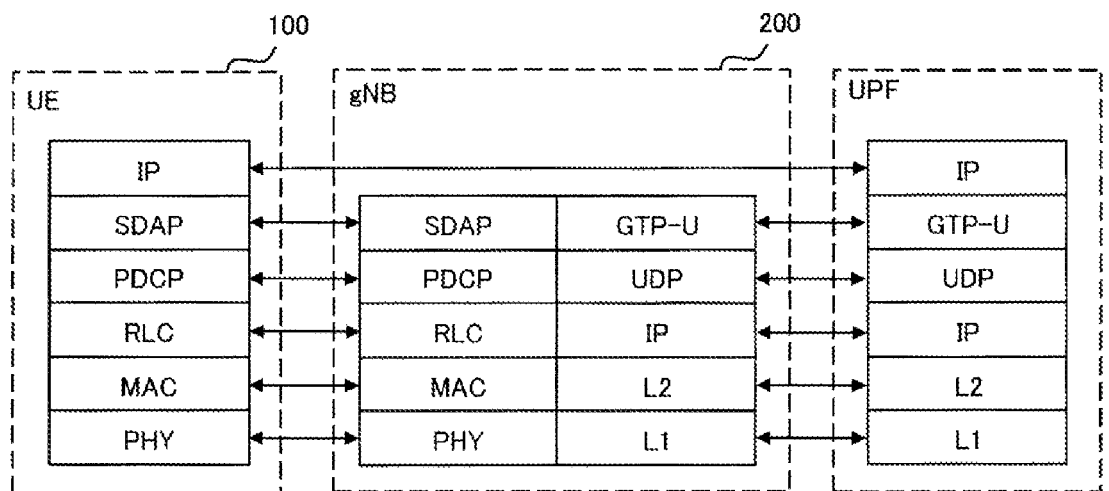
FIG. 5 is a diagram illustrating a configuration example of a protocol stack of a user plane according to the first embodiment.

FIG. 5 is a diagram illustrating a configuration of a protocol stack of a user plane handling data. The protocol of the user plane includes a radio interface protocol between the UE 100 and the gNB 200 and a wired interface protocol between the gNB 200 and the UPF.

The radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel. Note that the PHY layer of the UE 100 receives downlink control information (DCI) transmitted from the gNB 200 over a physical downlink control channel (PDCCH). Specifically, the UE 100 blind decodes the PDCCH using a radio network temporary identifier (RNTI) and acquires successfully decoded DCI as DCI addressed to the UE 100. The DCI transmitted from the gNB 200 is appended with CRC parity bits scrambled by the RNTI.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of QoS control by a core network and a radio bearer as the unit of QoS control by an Access Stratum (AS). Note that, when the RAN is connected to the EPC, the SDAP need not be provided.

The wired interface protocol of the user plane includes Layer 1 (L1), Layer 2 (L2), an Internet Protocol (IP) layer, a User Datagram Protocol (UDP) layer, and GPRS Tunneling Protocol for User Plane (GTP-U).

The L1 layer corresponds to the PHY layer in the radio interface protocol of the user plane. The L2 layer includes the MAC layer in the radio interface protocol of the user plane. The L2 layer is also referred to as a data link layer.

The IP layer corresponds to an Internet layer. An IP packet is transmitted and received between the IP layer of the gNB 200 and the IP layer of the UPF, using an IP address.

The UDP layer corresponds to a transport layer. A UDP packet can be transmitted between the UDP layer of the gNB 200 and the UDP layer of the UPF without waiting for a response from a counterpart with which communication is performed.

The GTP-U layer is a layer for transmitting and receiving a user plane Protocol Data Unit (PDU), using the General Packet Radio Service (GPRS) tunneling protocol. A GTP-U packet is transmitted and received between the GTP-U layer of the gNB 200 and the GTP-U layer of the UPF. A GPRS tunnel is identified with a Tunnel Endpoint Identifier (TEID).

Protocol Stack of Control Plane

Figure 6:
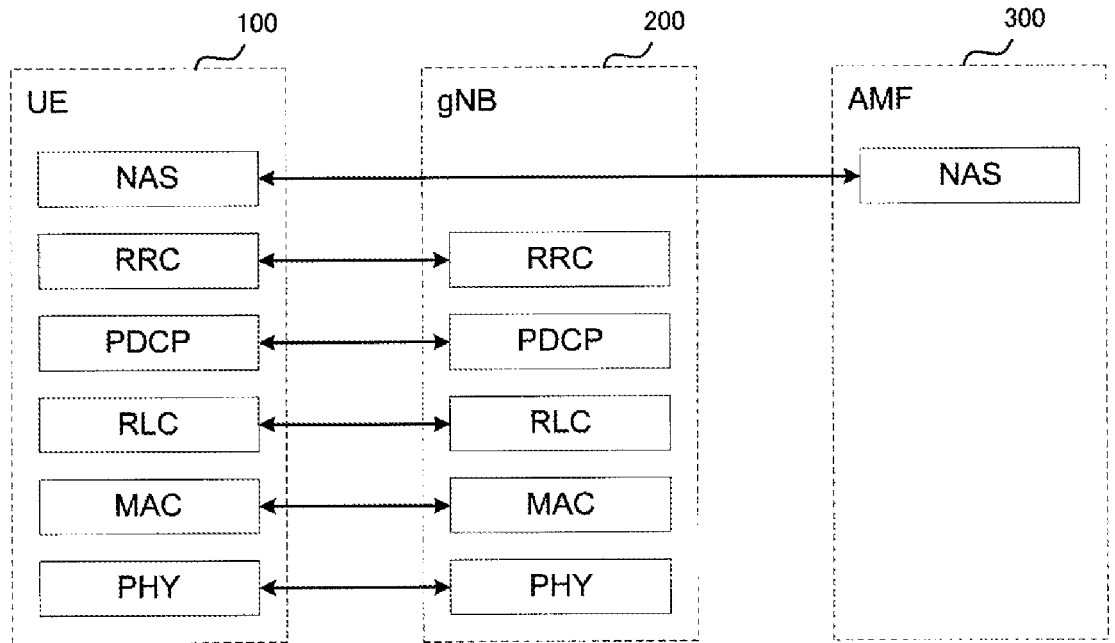
FIG. 6 is a diagram illustrating a configuration example of a protocol stack of a control plane according to the first embodiment.

FIG. 6 is a diagram illustrating a configuration of a protocol stack of a radio interface of a control plane handling signaling (a control signal).

The protocol stack of the radio interface of the control plane includes a Radio Resource Control (RRC) layer and Non-Access Stratum (NAS) instead of the SDAP layer illustrated in FIG. 6.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection (RRC connection) between the RRC of the UE 100 and the RRC of the gNB 200 is present, the UE 100 is in an RRC connected state. When no connection (RRC connection) between the RRC of the UE 100 and the RRC of the gNB 200 is present, the UE 100 is in an RRC idle state. When the connection between the RRC of the UE 100 and the RRC of the gNB 200 is suspended, the UE 100 is in an RRC inactive state.

The NAS which is positioned upper than the RRC layer performs session management, mobility management, and the like. NAS signaling is transmitted between the NAS of the UE 100 and the NAS of the AMF 300. Note that the UE 100 includes an application layer other than the protocol of the radio interface. A layer lower than the NAS is referred to as Access Stratum (AS).

Handover

As described above, handover is technology in which the UE 100 switches a cell to be connected to, for example. The UE 100 performs measurement in accordance with configuration information (MeasConfig) received from the gNB 200. The configuration information (MeasConfig) is transmitted from the gNB 200 to the UE 100, using an RRC message such as an RRC reconfiguration (RRCReconfiguration) message or an RRC resume (RRCResume) message.

The configuration information (MeasConfig) may include a measurement object (MeasObject), a report configuration (ReportConfig), a measurement ID (MeasID), and a measurement gap (MeasGap).

The measurement object (MeasObject) includes information for identifying a synchronization signal block (SSB) being the measurement object. Specifically, the measurement object (MeasObject) may include information indicating that a synchronization signal block (SSB) is the measurement object. Alternatively, the measurement object (MeasObject) may include information indicating frequency and time positions of a synchronization signal block being the measurement object. Alternatively, the measurement object (MeasObject) may include a list (white list) of cells being the measurement object and/or a list (black list) of cells not being the measurement object.

The report configuration (ReportConfig) includes information for identifying a criterion for triggering a measurement report. Specifically, the report configuration (ReportConfig) may include information such as reporting intervals when the measurement report is periodically performed. Alternatively, the report configuration (ReportConfig) may include information related to each event (for example, each event, and a threshold value, an offset value, and/or a hysteresis value used in each event) when the measurement report is performed with an event trigger. Examples of such events include an event in which a connected cell (serving cell) becomes better than a threshold value (event A1), an event in which the serving cell becomes worse than the threshold value (event A2), an event in which a neighboring cell becomes better than the serving cell by an offset (event A3), an event in which a neighboring cell becomes better than the threshold value (event A4), and an event in which the serving cell becomes worse than a first threshold value and a neighboring cell becomes better than a second threshold value (event A5). Alternatively, the report configuration (ReportConfig) may include information indicating which is used as a target of measurement quality (received quality), out of received power (Reference Signal Received Power (RSRP)), Reference Signal Received Quality (RSRQ), and Signal to Interference plus Noise Ratio (SINR).

The measurement ID (MeasID) is used for identifying the configuration information (MeasurementConfig), and links the measurement object (MeasurementObject) and the measurement report (MeasurementReport) to each other.

The measurement gap (MeasGap) includes information for configuring a time period (measurement gap) in which measurement is performed in the UE 100.

The UE 100 measures received quality of a cell in accordance with the configuration information (MeasConfig). The UE 100 may measure at least one beam of the cell, average measurement results, and thereby measure the received quality. The UE 100 transmits the measurement report (MeasurementReport) including the received quality as measurement results (MeasResults) to the gNB 200 in accordance with the configuration information. The measurement report is also a message transmitted when the UE 100 satisfies a condition related to the event trigger, for example.

The gNB 200 judges Handover Decision of the UE 100, based on the received quality. In other words, the gNB 200 judges execution or no execution of the handover in the UE 100, based on the received quality. When the gNB 200 determines execution of the handover in the UE 100, the gNB 200 transmits, to the UE 100, an RRC message (for example, an RRC reconfiguration message) including information necessary for access to a target cell. By receiving the RRC message, the UE 100 recognizes that the UE 100 can perform the handover, and starts connection to the target cell, using the information included in the RRC message.

Network Slice

Network slice(s) are configured on a network that is configured by an NG-RAN 10 and a 5GC 20. One or more network slices can be configured on the network. Each network slice is associated with one service type. Examples of such service types include eMBB, URLLC, Massive Internet of Things (MIoT), Vehicle to Everything (V2X), and High Performance Machin Type Communication (HMTC). For example, network slice #1 is associated with the service type of eMBB, network slice #2 is associated with the service type of MIoT, network slice #3 is associated with the service type of HMTC, and the like.

Note that the network slice may be hereinafter simply referred to as a "slice".

Each slice is provided with a slice identifier for identifying the slice. One example of the slice identifier is Single Network Slicing Selection Assistance Information (S-NS-SAI). The S-NSSAI includes an 8-bit slice/service type (SST). The S-NSSAI may further include a 24-bit slice differentiator (SD).

The SST is an example of service type information indicating a service type with which a slice is associated. For example, SST=1 indicates eMBB, SST=2 indicates URLLC, SST=3 indicates MIoT, SST=4 indicates V2X, and SST=5 indicates HMTC. Note that these are examples, and other service types may be associated with the respective SSTs, or other service types may be associated with values of other SSTs.

The SD is information for differentiating a plurality of slices associated with the same service type.

Information including a plurality of S-NSSAIs is referred to as Network Slice Selection Assistance Information (NS-SAI).

One or more slices may be grouped to configure a slice group. The slice group is a group including one or more slices, and a slice group identifier is assigned to the slice group. The slice group may be configured by the core network (for example, the AMF 300), or may be configured by the radio access network (for example, the gNB 200). The configured slice group may be notified to the UE 100.

Operation Example According to First Embodiment

An operation example according to the first embodiment will be described.

Figure 7:
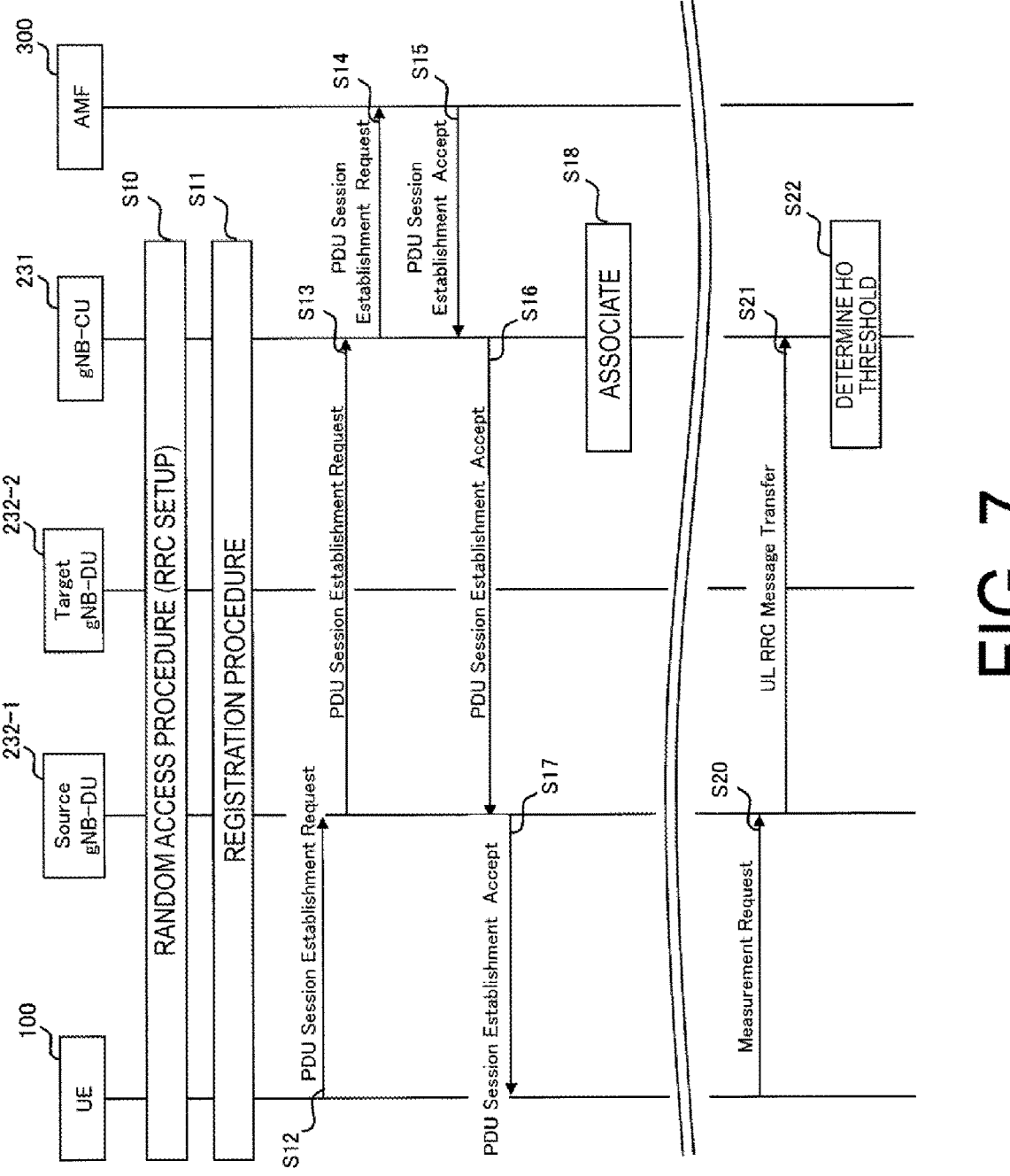
FIG. 7 is a diagram illustrating an operation example according to the first embodiment.
Figure 9:
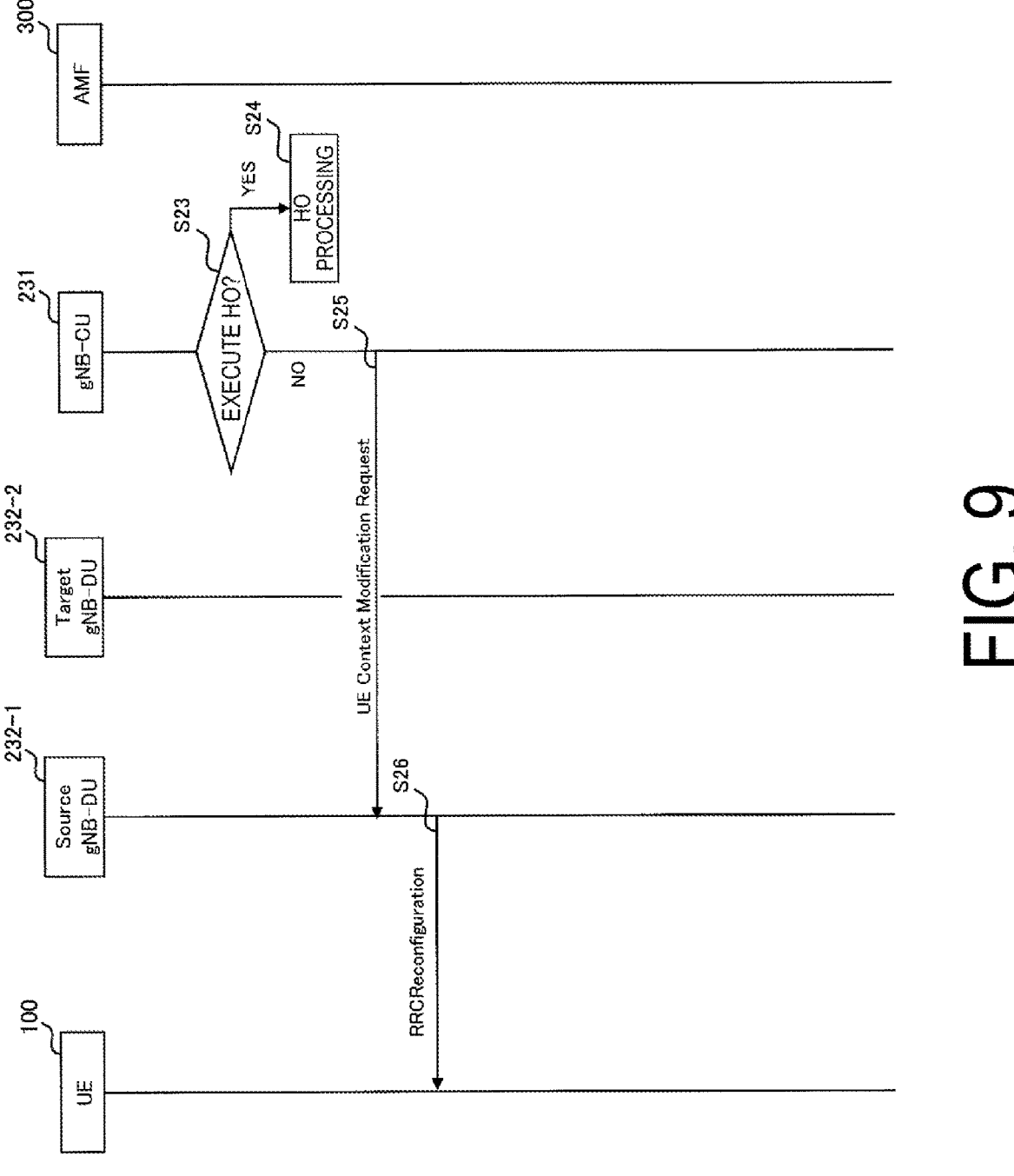
FIG. 9 is a diagram illustrating an operation example according to the first embodiment.

FIGS. 7 and 9 are diagrams illustrating operation examples according to the first embodiment. FIG. 7 illustrates an example in which the UE 100 performs handover from a source DU 232-1 accommodating a source cell to a target DU 232-2 accommodating a target cell. FIG. 7 illustrates an example in which the CU (or the gNB-CU) 231 manages the source DU 232-1 and the target DU 232-2. In other words, FIG. 7 illustrates an example of handover with an intra-CU.

As illustrated in FIG. 7, in Step S10, the UE 100 in the RRC idle state or the RRC inactive state executes the random access procedure, and transitions to the RRC connected state with the network. While executing the random access procedure, the UE 100 executes RRC setup, in order to establish RRC connection with the network. Specifically, the UE 100 transmits an RRC setup request (RRCSetupRequest) message to the CU 231 via the source DU 232-1 as message 3 (Msg3) in the random access procedure. Then, the CU 231 transmits an RRC setup (RRCSetup) message indicating acceptance of RRC connection establishment to the UE 100 via the source DU 232-1 as message 4 (Msg4) in the random access procedure. The UE 100 also establishes RRC connection with the network through the random access procedure.

In Step S11, the UE 100 executes a Registration procedure to perform registration with the network. Specifically, the UE 100 transmits a Registration Request message being a NAS message to the AMF 300 via the source DU 232-1 and the CU 231. Then, the UE 100 receives a Registration Accept message indicating an accept response for the registration request message from the AMF 300, and thereby completes registration with the network.

In Step S12, the UE 100 transmits a PDU Session Establishment Request message, and starts execution of a PDU session establishment procedure for establishing a PDU session. Specifically, the UE 100 may transmit an RRC message including the PDU session establishment request message to the source DU 232-1. The receiver 220 of the gNB 200 receives the RRC message, and outputs the received RRC message to the source DU 232-1.

In Step S13, the source DU 232-1 transfers the PDU session establishment request message transmitted from the UE 100 to the CU 231. Specifically, in response to reception of the RRC message including the PDU session establishment request message, the source DU 232-1 may transmit an F1AP message including the PDU session establishment request message to the CU 231.

In Step S14, the CU 231 transfers the PDU session establishment request message transmitted from the UE 100 to the AMF 300. Specifically, in response to reception of the F1AP message including the PDU session establishment request message, the CU 231 transmits an N2 message including the PDU session establishment request message to the AMF 300. The AMF 300 receives the PDU session establishment request message. In response to reception of the PDU session establishment request message, the AMF 300 selects the SMF, and requests the SMF to perform PDU session establishment with the UE 100. The AMF 300 receives a message including results (accept or reject) regarding the PDU session establishment request from the SMF. The following description will be given based on an assumption that the AMF 300 receives a message indicating PDU session establishment accept from the SMF.

In Step S15, the AMF 300 transmits a PDU Session Establishment Accept message indicating an accept response for the PDU session establishment request message to the UE 100. The PDU session establishment accept message is an example of a NAS message. Specifically, the AMF 300 may transmit an N2 message including the PDU session establishment accept message to the gNB 200. The receiver 220 of the gNB 200 receives the N2 message.

In Step S16, the CU 231 transfers the PDU session establishment accept message to the source DU 232-1. Specifically, in response to reception of the N2 message including the PDU session establishment accept message, the CU 231 may transmit an F1AP message including the PDU session establishment accept message to the source DU 232-1.

In Step S17, the source DU 232-1 transfers the PDU session establishment accept message to the UE 100. Specifically, in response to reception of the F1AP message including the PDU session establishment accept message, the source DU 232-1 may transmit an RRC message (for example, an RRC reconfiguration message) including the PDU session establishment accept message to the UE 100. The UE 100 receives the PDU session establishment accept message.

In Step S18, the CU 231 performs association between the UE 100 and a network slice. Specifically, the CU 231 performs association between a user equipment identifier (UE identifier) of the UE 100 and network slice information related to the network slice.

FIG. 8A is a diagram illustrating an example of association between the identifier of the UE 100 and the network slice information.

Firstly, the NSSAI may be used as the network slice information. Specifically, the SST included in the NSSAI may be used as the network slice information. As will be described below, in the CU 231, communication characteristics permitted for the UE 100 can be configured from the SST. The CU 231 may acquire the SST as follows, for example.

In other words, the UE 100 includes the NSSAI in the PDU session establishment request message to transmit the NSSAI (Step S12). When the AMF 300 receives the PDU session establishment request message (Step S14), the AMF 300 extracts the NSSAI included in the PDU session establishment request message, and transmits an Nsmf message (Nsmf_PDUSession_CreateSMContextRequest) including the NSSAI to the SMF, and thereby requests the SMF to perform PDU session establishment. When the SMF accepts establishment of a PDU session, the SMF transmits an Namf message (Namf_Communication_N1N2MessageTransfer) including the PDU session establishment accept message to the AMF 300. In this case, the SMF includes the accepted NSSAI in the PDU session establishment accept message to transmit the accepted NSSAI. The AMF 300 extracts the PDU session establishment accept message from the Namf message, and transmits the PDU session establishment accept message to the UE 100 (Step S15). The CU 231 extracts the accepted NSSAI from the PDU session establishment accept message, and may regard the NSSAI as the NSSAI illustrated in FIG. 8A.

Secondly, the IP address of the UE 100 may be used as the UE identifier of the UE 100. The CU 231 may acquire the IP address of the UE 100 as follows, for example. Specifically, the SMF assigns the IP address to the UE 100 when the SMF accepts PDU session establishment. The SMF includes the IP address assigned to the UE 100 in the PDU session establishment accept message as an accepted IP address to transmit the IP address. The CU 231 extracts the accepted IP address from the PDU session establishment accept message received from the AMF 300, and may regard the accepted IP address as the UE identifier illustrated in FIG. 8A. In other words, the CU 231 may extract the NSSAI and the IP address from the PDU session establishment accept message (Step S15) and thereby associate the NSSAI (the SST included in the NSSAI) and the IP address. The CU 231 may store the associated UE identifier and SST in the memory.

Thirdly, in the association, the CU 231 may configure communication characteristics corresponding to the network slice information. For example, as illustrated in FIG. 8A, "high speed and large capacity" is required in eMBB, and thus requirement of a wide frequency band that is wider than a certain band may be configured as the communication characteristics. "Ultra low latency" is required in URLLC, and thus the CU 231 may configure requirement of high received quality that is higher than certain quality as the communication characteristics, for example. Furthermore, "Other connection" is required in mMTC, and thus the CU 231 may configure that a stable frequency band is required as the communication characteristics, for example. In this manner, the CU 231 may configure the communication characteristics corresponding to the SST, based on the SST. Note that the communication characteristics illustrated in FIG. 8A are examples, and other communication characteristics may be configured. One example of such other communication characteristics is "continuation of data communication", in which the current data communication is prioritized over the measurement report.

Referring back to FIG. 7, in Step S20, when the UE 100 satisfies the event trigger, the UE 100 transmits the measurement report (MeasurementReport). The receiver 220 of the gNB 200 receives the measurement report, and outputs the measurement report to the source DU 232-1.

In Step S21, when the source DU 232-1 receives the measurement report, the source DU 232-1 transmits an uplink RRC message transfer (UL RRC Message Transfer) message including the measurement report to the CU 231. The uplink RRC message transfer message is an example of an F1AP message.

In Step S22, in response to reception of the measurement report, the CU 231 determines a threshold value to be used for judgment of execution or no execution of the handover.

Firstly, when second received quality (that is, "high received quality") higher than first received quality is required as the communication characteristics, the CU 231 may change to a threshold value (second threshold value) higher than a preconfigured threshold value (first threshold value), and thereby determine the threshold value. Specifically, when "high received quality" is required, the CU 231 may determine a value higher than the first threshold value (for example, threshold value represented by RSRP) by "−10 dBm" or higher as the threshold value (for example, threshold value represented by RSRP).

Secondly, when received quality ("higher received quality") higher than the second received quality is required as the communication characteristics, the CU 231 may change to a third threshold value higher than the second threshold value with respect to the preconfigured first threshold value, and thereby determine the threshold value. Specifically, when "higher received quality" is required, the CU 231 may determine a value higher than the first threshold value (for example, threshold value represented by RSRP) by "−20 dBm" or higher as the threshold value (for example, threshold value represented by RSRP).

Thirdly, a frequency band (that is, "stable frequency band") having a variation range smaller than a first variation range is required as the communication characteristics, the CU 231 may determine a threshold value for an RSRP threshold value related to RSRP and an SINR threshold value related to SINR. Specifically, when "stable frequency band" is required, the CU 231 may configure a preconfigured threshold value for RSRP as the RSRP threshold value, and configure a value of "5 dBm" or higher as the SINR threshold value. In this case, when the received quality includes RSRP and SINR, the RSRP is equal to or higher than the RSRP threshold value, and the SINR is equal to or higher than the SINR threshold value, execution of the handover may be determined. Use of the SINR threshold value for judgment of execution or no execution of the handover can allow the UE 100 to perform handover to a cell having less noise than a certain level (in other words, a cell that can provide the mMTC service).

In this manner, the CU 231 can determine the threshold value to be used for judgment of execution or no execution of the handover, based on the communication characteristics corresponding to the SST.

Note that, as illustrated in FIG. 8A, the CU 231 may identify the communication characteristics corresponding to the UE identifier, based on the IP address of the UE 100 included in the measurement report.

In Step S23 (FIG. 9), the CU 231 judges execution or no execution of the handover, based on the received quality included in the measurement report (MeasurementReport) and the threshold value determined in Step S22. When the received quality is equal to or higher than the threshold value (or when the received quality indicates a value higher than the threshold value), the CU 231 may determine execution of the handover. On the other hand, when the received quality is lower than the threshold value (or when the received quality is equal to or lower than the threshold value), the CU 231 may determine no execution of the handover. When the CU 231 determines execution of the handover (YES in Step S23), the processing transitions to Step S24. On the other hand, when the CU 231 does not determine execution of the handover (NO in Step S23), the processing transitions to Step S25.

In Step S24, the CU 231 performs processing for executing the handover. For example, the CU 231 transmits, to the UE 100, an RRC reconfiguration message including information for the UE 100 to access the target DU 232-2.

In Step S25, the CU 231 determines timing information indicating the next and following timings for transmitting the measurement report, based on the communication characteristics. The CU 231 transmits a message (second message) including the timing information to the UE 100. The CU 231 may determine the timing information as follows, for example.

Firstly, when "continuation of data communication" is required as the communication characteristics, and the UE 100 is performing data communication, the CU 231 may determine the timing information indicating a timing at which the next transmission timing of the measurement report is delayed from a configured transmission timing. By employing the timing later than configured timing information, the data communication in the UE 100 can be prioritized over transmission of the measurement report.

Secondly, when "high received quality" is required as the communication characteristics, the CU 231 may determine the timing information indicating that the next timing of transmitting the measurement report is a timing when the UE 100 finds a cell having the second received quality higher than the first received quality. By transmitting the measurement report at a timing of obtaining measurement results of the second received quality, the UE 100 can perform handover to a cell providing "high received quality".

The CU 231 transmits measurement timing configuration (MeasurementTimingConfiguration) information including the timing information to the UE 100.

Specifically, in Step S25, the CU 231 generates an RRC reconfiguration message including the measurement timing configuration information, includes the RRC reconfiguration message in a UE Context Modification Request message, and transmits the message to the source DU 232-1. The UE context modification request message is an example of an F1AP message, and is also an example of a second message.

FIG. 10A illustrates examples of information elements (IEs) included in the UE context modification request message according to the first embodiment. (The RRC reconfiguration message including) measurement timing configuration information may be included in "CU to DU RRC information" illustrated in FIG. 10A. FIG. 10B illustrates examples of information elements included in "CU to DU RRC information". The measurement timing configuration information may be included in "Measurement Timing Configuration" in "CU to DU RRC information".

Referring back to FIG. 9, in Step S26, the source DU 232-1 extracts the RRC reconfiguration message from the UE context modification request message, and transmits the RRC reconfiguration message to the UE 100. The UE 100 receives the RRC reconfiguration message, and transmits the next measurement report in accordance with the timing information included in the RRC reconfiguration message.

In this manner, in the first embodiment, the CU 231 determines the threshold value to be used for judgment of execution or no execution of the handover, based on the network slice information (for example, the SST). Specifically, firstly, the node (for example, the receiver 220 of the gNB 200) receives a first message including the network slice information related to the network slice from the core network apparatus (for example, the AMF 300). Secondly, the node (for example, the receiver 220 of the gNB 200) receives the measurement report from the user equipment (for example, the UE 100). Thirdly, in response to reception of the measurement report, the node (for example, the CU 231 of the gNB 200 (or the controller 230 of the gNB 200)) determines the threshold value to be used for judgment of execution or no execution of the handover, based on the network slice information. Fourthly, the node (for example, the CU 231 of the gNB 200 (or the controller 230 of the gNB 200)) judges execution or no execution of the handover in the user equipment, based on a received quality value indicating the received quality included in the measurement report and the threshold value.

In this manner, the gNB 200 can determine the threshold value to be used for judgment of execution or no execution of the handover, based on the network slice information, and can thus cause the UE 100 to perform handover to a cell that can provide a service indicated by the service type, for example. Therefore, the UE 100 can perform handover to an optimal cell according to the service type.

Other Operation Example According to First Embodiment

In the description of the first embodiment, the IP address is taken as an example of the UE identifier, but the UE identifier is not limited to this. The UE identifier may be a subscriber information identifier (Subscription Permanent Identifier (SUPI)), for example. In this case, in the registration procedure (Step S11), the AMF 300 receives an encrypted subscriber information identifier (Subscription Concealed Identifier (SUCI)) from the UE 100, and acquires a SUCI, which is decrypted from the SUCI, from Unified Data Management (UDM). In the registration procedure, the AMF 300 stores the SUPI together with the NSSAI accepted for the UE 100 in the memory or the like. Then, when the stored NSSAI and the NSSAI included in the message received from the SMF when the SMF accepts PDU session establishment match, the AMF 300 transmits the stored NSSAI and SUPI to the CU 231. As illustrated in FIG. 8A, the CU 231 performs association between the received NSSAI and SUPI (Step S18). Then, the CU 231 identifies the communication characteristics required by the UE 100 based on the SUPI included in the measurement report (Step S20 and Step S21), and determines the threshold value based on the communication characteristics (Step S22).

Second Embodiment

A second embodiment will be described. In the second embodiment, differences from the first embodiment will mainly be described.

The first embodiment describes an example in which the CU 231 determines the threshold value to be used for judgment of execution or no execution of the handover, based on the network slice information. The second embodiment will describe an example in which the CU 231 determines the threshold value, based on service quality information indicating service quality. Specifically, the second embodiment will describe an example in which the CU 231 configures the communication characteristics based on the service quality information included in the PDU session establishment accept message (Step S15), and determines the threshold value to be used for judgment of execution or no execution of the handover, based on the communication characteristics.

In PDU session establishment (Step S12 to Step S17 in FIG. 11), in the SMF, processing for establishing QoS flow(s) is performed between the UE 100 and the UPF. The QoS flow is the finest granularity for differentiating QoS in a PDU session. The QoS flow enables communication with certain QoS guaranteed, such as a bit rate and a packet error rate. The SMF may establish one or more QoS flows in a PDU session.

Each QoS flow can be identified with a QoS Flow ID (QFI). Meanwhile, each QoS characteristic can be identified with a 5QI. The 5QI is an example of a QoS identifier for identifying the QoS characteristics.

FIG. 11 is a diagram illustrating an example of the 5QI according to the first embodiment. The 5QI illustrated in FIG. 11 illustrates an example of the 5QI described in 3GPP TS 23.501 V17.9.0 (2023-06). As illustrated in FIG. 11, with the 5QI, the QoS characteristics such as a Packet Delay Budget and a Packet Error Rate can be uniquely determined. Note that the packet delay budget represents an upper time limit by which a packet is delayed between the UE 100 and the UPF. When a UL packet transmitted from the UE 100 and a DL packet transmitted from the UPF reach a transmission destination past the time indicated by the packet delay budget, the packets may be counted as packet loss.

The service quality information such as the 5QI and the QFI is included in the PDU session establishment accept message (Step S15 in FIG. 11). When the SMF establishes a QoS flow, the SMF generates a PDU session establishment accept message including the service quality information (specifically, QoS Flow level parameters), and transmits an Namf message (Namf_Communication_N1N2MessageTransfer) including the PDU session establishment accept message to the AMF 300. The AMF 300 extracts the PDU session establishment accept message from the Namf message, and transmits the PDU session establishment accept message to the CU 231 (Step S15 in FIG. 7). By extracting the service quality information from the PDU session establishment accept message, the CU 231 can acquire the service quality information. The PDU session establishment accept message is also an example of a first message, in a manner the same as and/or similar to the first embodiment.

The CU 231 can configure the communication characteristics, based on the service quality information.

FIG. 8B is a diagram illustrating an example of the communication characteristics according to the second embodiment. In the second embodiment, the communication characteristics are configured, using the network slice information (for example, the SST) and the service quality information. The example of FIG. 8B illustrates an example in which the packet delay budget and the packet error rate are used as the service quality information. In other words, in FIG. 8B, the CU 231 configures the communication characteristics, based on the SST, the packet delay budget, and the packet error rate. Then, the CU 231 can determine the threshold value to be used for judgment of execution or no execution of the handover, based on the communication characteristics.

Operation Example According to Second Embodiment

An operation example according to the second embodiment will be described.

Figure 12:
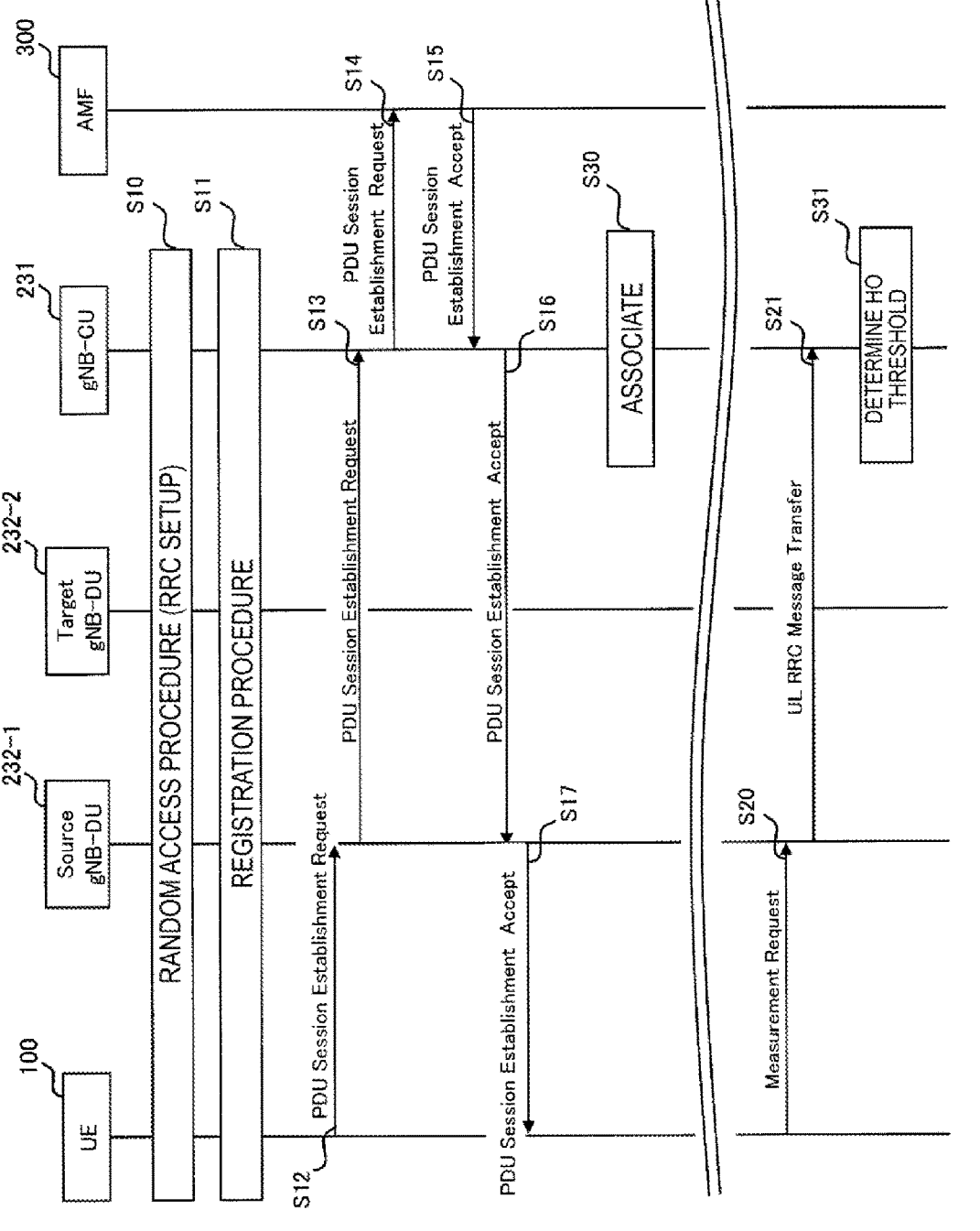
FIG. 12 is a diagram illustrating an operation example according to the second embodiment.

FIG. 12 is a diagram illustrating an operation example according to the second embodiment. FIG. 12 illustrates an example of handover with an intra-CU, in a manner the same as and/or similar to the first embodiment (FIG. 11). In FIG. 12, the same processes as those of the first embodiment (FIG. 11) are denoted by the same reference signs. Note that, in the following, description of the same processes as those of the first embodiment (FIG. 11) will be omitted.

As illustrated in FIG. 12, in Step S30, the CU 231 associates the UE identifier of the UE 100 and the service quality information. In a manner the same as and/or similar to the first embodiment, the PDU session establishment accept message (Step S15) includes the IP address of the UE 100 as an example of the UE identifier. The PDU session establishment accept message (Step S15) includes the service quality information (for example, the 5QI). The PDU session establishment accept message (Step S15) further includes the network slice information (for example, the SST), as described in the first embodiment. The CU 231 extracts the IP address of the UE 100, the 5QI, and the SST from the PDU session establishment accept message (Step S15), and associates the IP address, the 5QI, and the SST. The UE identifier illustrated in FIG. 8B illustrates an example of the IP address of the UE 100.

Then, in the association, in a manner the same as and/or similar to the first embodiment, the CU 231 performs configuration of the communication characteristics. Regarding the configuration of the communication characteristics, the CU 231 may determine the communication characteristics based on the network slice information, determine the communication characteristics based on the service quality information, and thereby determine the final communication characteristics based on the two communication characteristics. FIG. 8B illustrates an example of the final communication characteristics.

In Step S31, in response to reception of the measurement report from the UE 100, the CU 231 determines the threshold value to be used for judgment of execution or no execution of the handover, based on the service quality information. Specifically, in a manner the same as and/or similar to the first embodiment, the CU 231 determines the threshold value, based on the communication characteristics. The following processing is the same as and/or similar to that of the first embodiment (FIG. 9). The processing in which the CU 231 transmits the timing information indicating the transmission timing of the measurement report to the UE 100 based on the communication characteristics (Step S25 and Step S26) is the same as and/or similar to that of the first embodiment.

Other Operation Example According to Second Embodiment

The second embodiment describes an example in which the CU 231 determines the threshold value for judging execution or no execution of the handover, based on the network slice information and the service quality information. For example, the CU 231 may determine the threshold value, based on the service quality information, without using the network slice information. In this case, the CU 231 may determine the communication characteristics using the service quality information, without using the network slice information (Step S30).

In other words, firstly, the node (for example, the receiver 220 of the gNB 200) receives a first message (for example, a PDU session establishment accept message) including the network slice information related to the network slice and/or the service quality information indicating the service quality from the core network apparatus (for example, the AMF 300). Secondly, the node receives the measurement report from the user equipment (for example, the UE 100). Thirdly, in response to reception of the measurement report, the node (for example, the CU 231 of the gNB 200 (or the controller 230 of the gNB 200)) determines the threshold value to be used for judgment of execution or no execution of the handover, based on the network slice information and/or the service quality information. Fourthly, the node (for example, the CU 231 of the gNB 200 (or the controller 230 of the gNB 200)) judges execution or no execution of the handover in the user equipment, based on the received quality value indicating the received quality included in the measurement report and the threshold value.

Third Embodiment

A third embodiment will be described. In the third embodiment, differences from the first embodiment will mainly be described. The second embodiment describes an example in which the CU 231 determines the threshold value to be used for judgment of execution or no execution of the handover, based on the network slice information and/or the service quality information. The third embodiment will describe an example in which the threshold value is determined further using a connection state of the UE 100 and/or statistical information related to previous handover of the UE 100.

In other words, the CU 231 may determine the threshold value, based on at least one selected from the group consisting of the network slice information, the service quality information, the connection state of the user equipment (for example, the UE 100), and the statistical information of previous handover of the user equipment.

Examples of such connection states of the UE 100 include a state in which the UE 100 performs data communication and a state in which the UE 100 does not perform data communication. In the state in which the UE 100 performs data communication and the state in which the UE 100 does not perform data communication, the threshold value to be used for judgment of execution or no execution of the handover may have different values. In this case, the CU 231 configures different communication characteristics in the state in which the UE 100 performs data communication and the state in which the UE 100 does not perform data communication (Step S18 or Step S30). Then, in response to reception of the measurement report (Step S20 and Step S21), the CU 231 may check data packets between the UE 100 and the UPF, and determine the threshold value, based on the communication characteristics.

The CU 231 stores, in the memory, a threshold value when execution of the handover is judged and a threshold value when no execution of the handover is judged as previous handover statistical information, for example. The CU 231 may configure the threshold value when no execution of the handover is judged to be a threshold value higher than the threshold value when execution of the handover is judged (Step S22 or Step S31). Thus, for example, the CU 231 can more easily cause the UE 100 to perform handover to a cell in which execution of handover is previously judged.

The CU 231 may determine the threshold value by combining one of the connection state of the UE 100 and the previous handover statistical information and the network slice information, or may determine the threshold value by combining one of the connection state of the UE 100 and the previous handover statistical information and the service quality information. Alternatively, the CU 231 may determine the threshold value by combining the connection state of the UE 100, the previous handover statistical information, the network slice information, and the service quality information.

Other Embodiments

The first embodiment to the third embodiment describe an example of the handover with the intra-CU, but this is not restrictive. The handover may be handover with an inter-CU, in which the handover is performed between CUs. In this case, for example, in FIGS. 7 and 9, the source DU 232-1 may be replaced with a source gNB (or the CU of the source gNB), and the target DU 232-2 may be replaced with a target gNB (or the CU of the target gNB). In this case, the PDU session establishment request message is transmitted from a source gNB 200-1 to the AMF 300 (Step S14), and the PDU session establishment accept message is transmitted from the AMF 300 to the source gNB 200-1 (Step S15). The association (Step S18) and the handover decision (Step S22) may be performed in the source gNB 200-1.

A program may be provided to cause a computer to execute the operations and the processes described in the first embodiment to the third embodiment. The program may be recorded in a computer readable medium of the gNB 200. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing the operations and the processes may be integrated, and a part thereof may be configured as a semiconductor integrated circuit (a chipset or an SoC).

Although embodiments have been described in detail with reference to the drawings, a specific configuration is not limited to those described above, and various design modifications and the like can be made without departing from the scope of the present disclosure. All of or a part of the embodiments, the operations, the processes, and the steps can be combined together as long as no inconsistencies are introduced.

Supplementary Note

Supplementary Note 1

A communication control method in a mobile communication system, the communication control method including:
receiving, at a base station, a first message including network slice information related to a network slice and/or service quality information indicating service quality from a core network apparatus;
receiving, at the base station, a measurement report from a user equipment;
determining, at the base station, a threshold value to be used for judgment of execution or no execution of handover, based on the network slice information and/or the service quality information, in response to reception of the measurement report; and
judging, at the base station, execution or no execution of the handover in the user equipment, based on a received quality value indicating received quality included in the measurement report and the threshold value.

Supplementary Note 2

The communication control method according to supplementary note 1, in which
the network slice information is a network slice identifier that identifies the network slice.

Supplementary Note 3

The communication control method according to supplementary note 1 or 2, in which
the network slice information is included in the network slice identifier and is service type information indicating a service type associated with the network slice.

Supplementary Note 4

The communication control method according to any one of supplementary notes 1 to 3, in which
the service quality information is a QoS identifier that identifies QoS characteristics.

Supplementary Note 5

The communication control method according to any one of supplementary notes 1 to 4, in which
the first message includes a user equipment identifier that identifies the user equipment, and
the communication control method further includes performing, at the base station, association between the user equipment identifier and the network slice information and/or association between the user equipment identifier and the service quality information, based on the first message.

Supplementary Note 6

The communication control method according to any one of supplementary notes 1 to 5, in which
the determining includes determining, at the base station, the threshold value, based on communication characteristics corresponding to the network slice information and/or the service quality information.

Supplementary Note 7

The communication control method according to any one of supplementary notes 1 to 6, in which the determining includes changing, at the base station, the threshold value to a second threshold value higher than a first threshold value, when second received quality higher than first received quality is required as the communication characteristics.

Supplementary Note 8

The communication control method according to any one of supplementary notes 1 to 7, in which
the determining includes determining, at the base station, an RSRP threshold value related to RSRP and an SINR threshold value related to SINR as the threshold value, when a frequency band having a variation range smaller than a first variation range is required as the communication characteristics corresponding to the network slice.

Supplementary Note 9

The communication control method according to any one of supplementary notes 1 to 8, further including:
transmitting, at the base station to the user equipment, a second message including timing information indicating a timing of transmitting the measurement report, based on the communication characteristics;
receiving, at the user equipment, the second message; and
transmitting, at the user equipment, the measurement report in accordance with the timing information.

Supplementary Note 10

The communication control method according to any one of supplementary notes 1 to 9, in which
the determining includes determining, at the base station, the threshold value, based on at least one selected from the group consisting of the network slice information, the service quality information, a connection state of the user equipment, and statistical information of previous handover of the user equipment.

Supplementary Note 11

A base station configured to communicate with a user equipment and a core network apparatus, the base station including:
a receiver that receives a first message including network slice information related to a network slice and/or service quality information indicating service quality from the core network apparatus and receives a measurement report from the user equipment; and
a controller that determines a threshold value to be used for handover decision, based on the network slice information and/or the service quality information, in response to reception of the measurement report, in which
the controller judges execution or no execution of handover in the user equipment, based on a received quality value indicating received quality included in the measurement report and the threshold value.

| REFERENCE SIGNS | |
| --- | --- |
| 1: Mobile communication system | 100: UE |
| 110: Receiver | 120: Transmitter |
| 130: Controller | 200: gNB (RAN) |

-continued

REFERENCE SIGNS

| | |
|---|---|
| 210: Transmitter | 220: Receiver |
| 230: Controller | 231: CU |
| 232: DU | 250: Network communicator |
| 300: AMF | 310: Receiver |
| 320: Transmitter | 330: Controller |

The invention claimed is:

1. A communication control method in a mobile communication system, the communication control method comprising:

receiving, at a node, a first message comprising at least one of network slice information related to a network slice or service quality information indicating service quality from a core network apparatus;

receiving, at the node, a measurement report from a user equipment, based on a first threshold;

determining, at the node, a second threshold to be used for handover decision by modifying the first threshold to the second threshold higher than the first threshold, based on communication characteristics corresponding to at least one of the network slice information or the service quality information, in response to reception of the measurement report, when higher received quality is required as the communication characteristics; and deciding, at the node, whether to handover the user equipment, based on the second threshold and a received quality value indicating received quality included in the measurement report.

2. The communication control method according to claim 1, wherein the network slice information is a network slice identifier configured to identify the network slice.

3. The communication control method according to claim 2, wherein the network slice information is service type information indicating a service type associated with the network slice included in the network slice identifier.

4. The communication control method according to claim 1, wherein the service quality information is a QoS identifier configured to identify QoS characteristics.

5. The communication control method according to claim 1, wherein the first message comprises a user equipment identifier configured to identify the user equipment, and wherein the communication control method further comprises performing, at the node, at least one of association between the user equipment identifier and the network slice information or association between the user equipment identifier and the service quality information, based on the first message.

6. The communication control method according to claim 1, wherein the determining comprises determining, at the node, an RSRP threshold value related to RSRP and an SINR threshold value related to SINR as the second threshold, when a frequency band having a variation range smaller than a first variation range is required as the communication characteristics corresponding to the network slice.

7. The communication control method according to claim 1, further comprising:

transmitting, at the node to the user equipment, a second message comprising timing information indicating a timing of transmitting the measurement report, based on the communication characteristics;

receiving, at the user equipment, the second message; and transmitting, at the user equipment, the measurement report in accordance with the timing information.

8. The communication control method according to claim 1, wherein the determining comprises determining, at the node, the second threshold, based on at least one selected from the group consisting of the network slice information, the service quality information, a connection state of the user equipment, and statistical information of previous handover of the user equipment.

9. A node configured to communicate with a user equipment and a core network apparatus, the node comprising:

a receiver configured to receive a first message comprising at least one of network slice information related to a network slice or service quality information indicating service quality from the core network apparatus and receive a measurement report from the user equipment, based on a first threshold; and a controller configured to determine a second threshold to be used for handover decision by modifying the first threshold to the second threshold higher than the first threshold, based on communication characteristics corresponding to at least one of the network slice information or the service quality information, in response to reception of the measurement report, when higher received quality is required as the communication characteristics, wherein the controller is configured to decide whether to handover the user equipment, based on the second threshold and a received quality value indicating received quality included in the measurement report.

10. The communication control method according to claim 1, comprising after receiving the measurement report from the user equipment, determining, at the node, a timing of transmitting a following measurement report, based on communication characteristics in response to deciding not to handover, the communication characteristics corresponding to at least one of the network slice information or the service quality information; and transmitting a second message from the node to the user equipment, the second message comprising timing information indicating the timing of transmitting the following measurement report.

11. The node according to claim 9, wherein the controller is configured to:

after receiving of the measurement report from the user equipment via the receiver, determine a timing of transmitting a following measurement report, based on communication characteristics in response to deciding not to handover, the communication characteristics corresponding to at least one of the network slice information or the service quality information; and transmit a second message to the user equipment via a transmitter, the second message comprising timing information indicating the timing of transmitting the following measurement report.

* * * * *